(12) United States Patent
Yamanashi et al.

(10) Patent No.: US 9,615,647 B2
(45) Date of Patent: Apr. 11, 2017

(54) MAKEUP APPLICATION ASSISTANCE DEVICE, MAKEUP APPLICATION ASSISTANCE METHOD, AND MAKEUP APPLICATION ASSISTANCE PROGRAM

(71) Applicant: PANASONIC CORPORATION, Osaka (JP)

(72) Inventors: Tomofumi Yamanashi, Kanagawa (JP); Rieko Asai, Osaka (JP); Aoi Muta, Osaka (JP); Chie Nishi, Osaka (JP); Kaori Ajiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/388,923

(22) PCT Filed: Jan. 20, 2014

(86) PCT No.: PCT/JP2014/000244
§ 371 (c)(1),
(2) Date: Sep. 29, 2014

(87) PCT Pub. No.: WO2014/119242
PCT Pub. Date: Aug. 7, 2014

(65) Prior Publication Data
US 2015/0049111 A1 Feb. 19, 2015

(30) Foreign Application Priority Data
Feb. 1, 2013 (JP) .................. 2013-018266

(51) Int. Cl.
*G06T 11/00* (2006.01)
*G06T 11/60* (2006.01)
*A45D 44/00* (2006.01)

(52) U.S. Cl.
CPC .......... *A45D 44/005* (2013.01); *G06T 11/001* (2013.01); *G06T 11/60* (2013.01);
(Continued)

(58) Field of Classification Search
None
See application file for complete search history.

(56) References Cited

U.S. PATENT DOCUMENTS 7,648,364 B2 * 1/2010 Dauga .................. A45D 44/005
434/100
2004/0078278 A1 4/2004 Dauga et al.
(Continued)

FOREIGN PATENT DOCUMENTS

EP 2178045 4/2010
FR 2952519 5/2011
(Continued)

OTHER PUBLICATIONS

International Search Rreport from PCT/JP2014/000244, mail date is Apr. 22, 2014.
(Continued)

*Primary Examiner* — Michelle Chin
(74) *Attorney, Agent, or Firm* — Greenblum & Bernstein, P.L.C.

(57) ABSTRACT

A makeup application assistance device includes: an image acquisition unit that acquires an image obtained by photographing a face; a face part acquisition unit that acquires, from the image, face part regions of the face; a face makeup technique selection unit that selects a face makeup technique, which is a face makeup application method, for each face part; a skin condition acquisition unit that acquires the skin condition of the face; a skin correction makeup technique selection unit that selects, on the basis of the skin condition, a skin correction makeup technique, which is a
(Continued)

skin correction makeup application method; and a makeup technique presentation unit that presents the selected face makeup techniques associated with the corresponding face part regions, and presents the selected skin correction makeup technique, to a user.

10 Claims, 15 Drawing Sheets

(52) U.S. Cl.
CPC ............... *A45D 2044/007* (2013.01); *G06T 2207/10004* (2013.01); *G06T 2207/10024* (2013.01); *G06T 2207/20021* (2013.01); *G06T 2207/30201* (2013.01)

(56) References Cited

U.S. PATENT DOCUMENTS

| | | |
|---|---|---|
| 2010/0226531 A1 | 9/2010 | Goto |
| 2012/0223956 A1 | 9/2012 | Saito et al. |
| 2013/0169827 A1* | 7/2013 | Santos ............... H04N 5/23229 348/207.1 |

FOREIGN PATENT DOCUMENTS

| | | |
|---|---|---|
| JP | 2001-104050 | 4/2001 |
| JP | 2001-346627 | 12/2001 |
| JP | 2003-044837 | 2/2003 |
| JP | 2007-133518 | 5/2007 |
| JP | 2007-216000 | 8/2007 |
| JP | 2007-310652 | 11/2007 |
| JP | 2010-086036 | 4/2010 |
| JP | 2012-181688 | 9/2012 |
| JP | 5116965 | 1/2013 |
| JP | 2014/000244 | 4/2014 |
| WO | 02/01499 | 1/2002 |

OTHER PUBLICATIONS

U.S. Appl. No. 14/388,998 to Tomofumi Yamanashi et al., filed Sep. 29, 2014.
U.S. Appl. No. 14/389,018 to Tomofumi Yamanashi et al., filed Sep. 29, 2014.
U.S. Appl. No. 14/387,696 to Tomofumi Yamanashi et al., filed Sep. 24, 2014.
European Search report in European Patent Application No. 14745809 5, mail date is May 12, 2015.
Office Action issued in Japan Counterpart Patent Appl. No. 2016-010748, dated Jan. 17, 2017.

* cited by examiner

| FACIAL PART FEATURE VALUE GROUP | FACIAL MAKEUP ID |
|---|---|
| FG1 | FM1 |
| FG2 | FM2, FM3 |
| FG3 | FM4 |
| ⋮ | ⋮ |

| FACIAL MAKEUP ID (421) | MAKEUP TYPE (422) | COLOR (423) | CONCENTRATION (424) | RANGE (425) | COSMETICS ID (426) |
|---|---|---|---|---|---|
| FM1 | T1 | C1 | D1 | A1 | I1 |
| FM1 | T2 | C2 | D2 | A2 | I2 |
| FM1 | T3 | C3 | D3 | A3 | I3 |
| FM1 | T4 | C3 | D2 | A4 | I4 |
| ⋮ | ⋮ | ⋮ | ⋮ | ⋮ | ⋮ |

FIG. 4

| COSMETICS ID | COMPANY ID | ITEM NUMBER |
|---|---|---|
| I1 | B1 | b11 |
| I2 | B1 | b23 |
| ⋮ | ⋮ | ⋮ |

FIG. 5

| SKIN CONDITION FEATURE VALUE GROUP | SKIN CORRECTION MAKEUP ID |
|---|---|
| SG1 | SM1 |
| SG2 | SM2 |
| SG3 | SM3 |
| ⋮ | ⋮ |

FIG. 6

| SKIN CORRECTION MAKEUP ID | MAKEUP TYPE | COLOR | CONCENTRATION | RANGE | COSMETICS ID |
|---|---|---|---|---|---|
| SM1 | T5 | C1 | D3 | A5 | I1 |
| SM2 | T6 | C4 | D3 | A5 | I5 |
| ⋮ | ⋮ | ⋮ | ⋮ | ⋮ | ⋮ |

FIG. 7

| COSMETICS ID | COMPANY ID | ITEM NUMBER |
|---|---|---|
| I1 | B1 | b11 |
| I5 | B3 | b32 |
| ⋮ | ⋮ | ⋮ |

FIG. 8

| FACIAL PART ID | AREA | PERSON ID |
|---|---|---|
| P1 | R1 | H1 |
| P2 | R2 | H1 |
| ⋮ | ⋮ | ⋮ |

| AREA ID 541 | AREA 542 | COLOR DIFFERENCE 543 | AREA RATIO 544 | PERSON ID 545 |
|---|---|---|---|---|
| S1 | R3 | CD1 | AR1 | H1 |
| S2 | R4 | CD2 | AR2 | H1 |
| .... | .... | .... | .... | .... |

540

| 561 SKIN ITEM | 562 COLOR | 563 POSITION | 564 SHAPE | 565 NUMBER | 566 AREA | 567 CONDUCTIVITY | 568 REFLECTIVITY |
|---|---|---|---|---|---|---|---|
| SPOT | C5 | V1 | F1 | N1 | Q1 | — | — |
| DULLNESS | C6 | V2 | — | N2 | — | — | L1 |
| WRINKLE | C7 | V3 | F2 | N3 | Q2 | — | — |
| PORE | C8 | V4 | F3 | N4 | Q1 | O1 | — |
| MOISTURE | — | — | — | — | — | O1 | — |
| OIL | — | — | — | — | — | — | L2 |
| TEXTURE | C9 | — | — | — | — | — | — |
| RUDDINESS | C10 | — | — | — | — | — | — |
| ..... | ..... | ..... | ..... | ..... | ..... | ..... | ..... |

MAKEUP APPLICATION ASSISTANCE DEVICE, MAKEUP APPLICATION ASSISTANCE METHOD, AND MAKEUP APPLICATION ASSISTANCE PROGRAM

TECHNICAL FIELD

The present invention relates to a makeup assisting apparatus, a makeup assisting method and a makeup assisting program for assisting facial makeup (cosmetic makeup).

BACKGROUND ART

In recent years, the way of making up the face (hereinafter, simply referred to as "makeup") has been diversified. What kind of makeup is appropriate varies according to the size, shape, location, and the like of a facial part (eyes, eyebrows, nose, cheekbones, lips, outline, or the like) of the face to which makeup is to be applied, in addition to the trend and preference of a person who puts on her makeup.

Therefore, it has become difficult, particularly for a person who has no sufficient knowledge about makeup to select appropriate makeup because it takes an enormous amount of time and effort to actually try, judge and compare various types of makeup.

To address the above-described problem, techniques of generating and presenting a simulation image which simulates the face to which makeup is applied are disclosed in, for example, PTL 1 and PTL 2. In the techniques disclosed in PTL 1 and PTL 2 (hereinafter, referred to as "related art"), a captured image of the face to which makeup is to be applied (hereinafter, simply referred to as the "face") is acquired. Further, with the related art, the simulation image is generated by superimposing, on the acquired image, an image indicating a state of makeup, such as a lipstick and blush, when the makeup is applied to the face. With the related art, the generated simulation image is displayed at a display apparatus. Such makeup that corrects impression of features of facial parts to improve aesthetics will be hereinafter referred to as "facial cosmetic makeup."

The related art allows a user to judge whether the makeup is good or bad without actually applying the makeup, thus allowing the user to select appropriate makeup with less time and effort.

CITATION LIST

Patent Literature

PTL 1
Japanese Patent Application Laid-Open No. 2001-346627
PTL 2
Japanese Patent Application Laid-Open No. 2003-44837
PTL 3
Japanese Patent Application Laid-Open No. 2007-133518

SUMMARY OF INVENTION

Technical Problem

Makeup also includes a concealer or the like for concealing shadows below the eyes, in addition to the above-described facial cosmetic makeup. Such makeup that partially corrects the skin condition to improve aesthetics will be hereinafter referred to as "skin correction cosmetic makeup." Further, makeup to be applied to the face includes so-called basic skin care in addition to the above-described makeup. The basic skin care is care for the skin performed by, for example, application of some lotion, serum, or the like.

The impression of the face varies according to the way of applying skin correction cosmetic makeup (hereinafter, referred to as "skin correction makeup") and the way of applying basic skin care (hereinafter, referred to as "skin care") as well as the way of applying facial cosmetic makeup (hereinafter, referred to as "facial makeup"). Further, an effect of the facial makeup often varies according to the skin correction makeup and skin care. For example, concealing shadows below the eyes with the concealer gives an impression of the face that the person is younger, so that the person looks well With makeup suited for younger people. Meanwhile, when the skin condition is not favorable due to a lack of appropriate skin care, the actual face after the makeup may be quite different from the simulation image because makeup is not applied well to the face.

Therefore, if skin correction makeup or skin care not appropriate for the skin condition is applied, or if required skin correction makeup or skin care is not applied, there is a case where a user may misjudge as to whether facial makeup is appropriate. Most users neither sufficiently recognize the skin condition of each facial part nor have sufficient knowledge about skin correction makeup and skin care. Moreover, the skin condition is not taken into account in the relate art.

It is therefore an object of the present invention to provide a makeup assisting apparatus, a makeup assisting method and a makeup assisting program which can appropriately assist makeup even for the face whose skin condition is not favorable.

Solution to Problem

A makeup assisting apparatus according to an aspect of the present invention includes: an image acquiring section that acquires a captured image of a face; a facial part acquiring section that acquires an area of a facial part of the face from the image; a facial makeup selecting section that selects facial makeup for each of the facial parts, the facial makeup being a way of applying the facial makeup; a skin condition acquiring section that acquires a skin condition of the face; a skin correction makeup selecting section that selects skin correction makeup or skin care based on the skin condition, the skin correction makeup being a way of applying the skin correction makeup, and the skin care being a way of applying basic skin care; and a makeup presenting section that presents to a user the selected facial makeup in association with a corresponding area of the facial part and presents the selected skin correction makeup or skin care.

A makeup assisting method according to an aspect of the present invention includes: acquiring a captured image of a face; acquiring an area of a facial part from the image; selecting facial makeup for each of the facial parts, the facial makeup being a way of applying the facial makeup; acquiring a skin condition of the face; selecting skin correction makeup or skin care based on the skin condition, the skin correction makeup being a way of applying the skin correction makeup, and the skin care being a way of applying basic skin care; and presenting to a user the selected facial makeup in association with a corresponding area of the facial part and presenting the selected skin correction makeup or skin care.

A makeup assisting program according to according to an aspect of the present invention is a program causing a computer to execute processing including: acquiring a captured image of a face; acquiring an area of a facial part from the image; selecting facial makeup for each of the facial parts, the facial makeup being a way of applying the facial makeup; acquiring a skin condition of the face; selecting skin correction makeup or skin care based on the skin condition, the skin correction makeup being a way of applying the skin correction makeup, and the skin care being a way of applying basic skin care; and presenting to a user the selected facial makeup in association with a corresponding area of the facial part and presenting the selected skin correction makeup or skin care.

Advantageous Effects of Invention

According to the present invention, it is possible to appropriately assist makeup even for the face whose skin condition is not favorable.

BRIEF DESCRIPTION OF DRAWINGS

FIG. 3 illustrates an example of a facial makeup ID table in Embodiment 2;

FIG. 4 illustrates an example of a facial makeup table in Embodiment 2;

FIG. 5 illustrates an example of a facial cosmetics table in Embodiment 2;

FIG. 6 illustrates an example of a skin correction makeup ID table in Embodiment 2;

FIG. 7 illustrates an example of a skin correction makeup table in Embodiment 2;

FIG. 8 illustrates an example of a skin correction cosmetics table in Embodiment 2;

FIG. 12 illustrates an example of facial part information in Embodiment 2;

FIG. 13 illustrates an example of skin condition information in Embodiment 2;

FIG. 15 illustrates an example of skin condition information for selecting skin care in Embodiment 2.

DESCRIPTION OF EMBODIMENTS

Each embodiment of the present invention will be described in detail below with reference to the accompanying drawings.

Embodiment 1

Embodiment 1 of the present invention is an example of a basic mode of the present invention.

Figure 1:
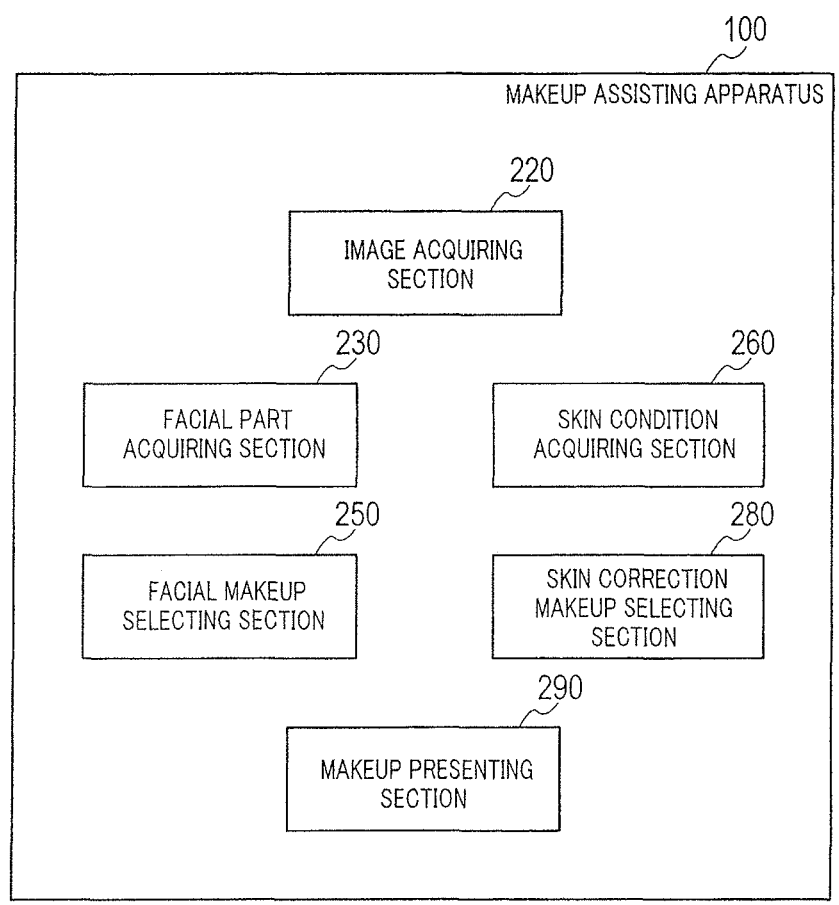
FIG. 1 is a block diagram illustrating an exemplary configuration of a makeup assisting apparatus according to Embodiment 1 of the present invention.

FIG. 1 is a block diagram illustrating an exemplary configuration of a makeup assisting apparatus according to the present embodiment.

In FIG. 1, makeup assisting apparatus 100 includes image acquiring section 220, facial part acquiring section 230, facial makeup selecting section 250, skin condition acquiring section 260, skin correction makeup selecting section 280 and makeup presenting section 290.

Image acquiring section 220 acquires a captured image of the face.

Facial part acquiring section 230 acquires an area of a facial part of the face from the captured image.

Facial makeup selecting section 250 selects facial makeup for each facial part. Here, the facial makeup refers to the way (type) of applying facial cosmetic makeup.

Skin condition acquiring section 260 acquires the skin condition of the face.

Skin correction makeup selecting section 280 selects skin correction makeup/skin care based on the acquired skin condition. That is, skin correction makeup selecting section 280 performs selection based on the skin condition for at least one of the skin correction makeup, and the skin care. Here, the skin correction makeup refers to the way (type) of applying skin correction cosmetic makeup. Further, the skin care refers to the way (type) of applying basic skin care.

Makeup presenting section 290 presents, to a user, the selected facial makeup and the corresponding area of the facial part in association with each other, and presents the selected skin correction makeup/skin care.

Makeup assisting apparatus 100 has, for example, a central processing unit (CPU), a storage medium such as a read-only memory (ROM) having a control program stored therein, and a working memory such as a random access memory (RAM), although these components are not illustrated. In this case, the above-described functions of the sections are implemented by the CPU executing the control program.

Makeup assisting apparatus 100 configured as described above can not only present to the user the facial makeup and the corresponding area in association with each other, but also can present the skin correction makeup/skin care selected based on the skin condition. That is, makeup assisting apparatus 100 can present appropriate skin correction makeup/skin care along with the simulation image which simulates the face to which appropriate facial makeup is applied. Therefore, makeup assisting apparatus 100 can appropriately assist makeup even for the face whose skin condition is not favorable.

Embodiment 2

Embodiment 2 of the present invention is an example of a specific mode of the present invention, in which the present invention is applied to an apparatus which has a digital video camera and a display with touch panel on the same face side.

EXPLANATION OF TERMS

First, terms used in the present embodiment will be described.

A "facial part" refers to a part characterizing impression of the face, such as eyes, eyebrows, nose, cheekbones, lips and an outline.

An "area of the facial part" refers to an area occupied by the facial part on an image or in real space, and includes a position of a feature point of the facial part, such as corners of the eyes.

A "facial part feature value" refers to a value of a predetermined parameter which indicates features of the face. Here, the facial part feature value is multivariate data including a plurality of values such as a ratio of a length of the face with respect to a width of the face, a ratio of a length of the nose with respect to a distance between both eyes and a ratio of a width of the eye with respect to the width of the face.

"Divided facial areas" refer to areas obtained by dividing a facial area of the face.

"Skin condition" include at least one of condition of spots (macules), condition of wrinkles, condition of dullness, condition of shadows, condition of pores, condition of moisture, condition of oil, condition of texture and condition of ruddiness.

A "skin condition feature value" refers to a value of a predetermined parameter which indicates features of the skin condition. Here, the skin condition feature value is multivariate data including a plurality of values such as severity of condition of shadows of the eyes and severity of condition of the spots. Here, the severity is, for example, a magnitude of a difference in color of the skin of the facial area from an average value. It should be noted that the skin condition feature value may include a value relating to a relative position in the face.

An "area where skin correction is required" is a divided facial area where the skin condition reach a predetermined level at which skin correction makeup should be applied.

"Facial makeup" indicates the way (type) of applying makeup that corrects impression of features of the facial part to improve aesthetics, and includes at least a color, application concentration and application range of a skin cosmetic agent.

"Skin correction makeup" indicates the way (type) of applying makeup that partially corrects the skin condition to improve aesthetics, and includes at least a color, application concentration and application range of a skin cosmetic agent.

"Skin care" indicates the way (type) of applying basic skin care for conditioning the skin, and includes a type of basic skin care, the amount of application of each time, an application range, an application frequency, hours at which basic skin care is applied, the way of application, and the like.

<Configuration of Makeup Assisting Apparatus>

Next, a configuration of the makeup assisting apparatus according to the present embodiment will be described.

Figure 2:
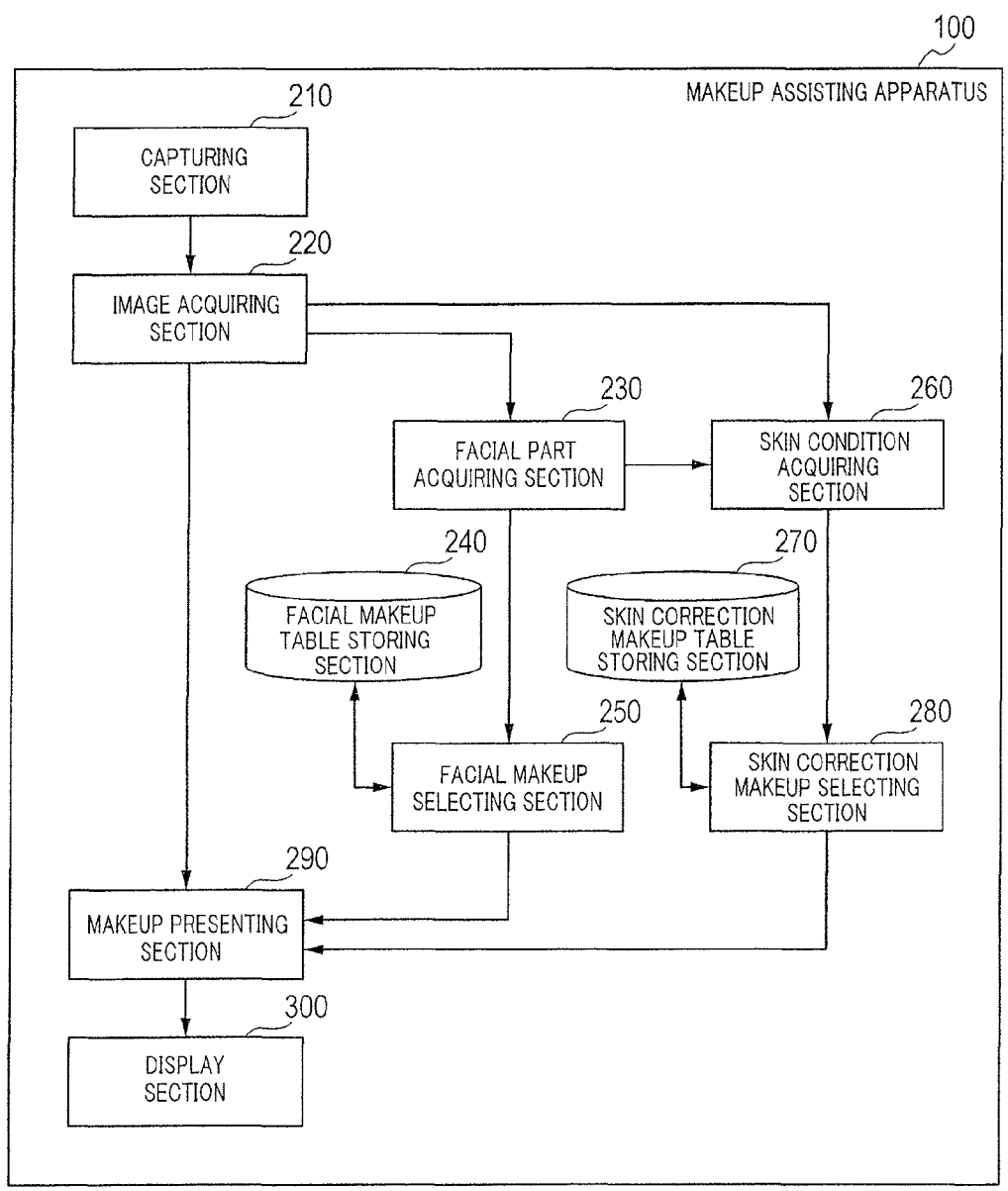
FIG. 2 is a block diagram illustrating an exemplary configuration of a makeup assisting apparatus according to Embodiment 2 of the present invention.

FIG. 2 is a block diagram illustrating an exemplary configuration of the makeup assisting apparatus according to the present embodiment. The makeup assisting apparatus is, for example, a touch panel terminal with camera.

In FIG. 2, makeup assisting apparatus 100 includes capturing section 210, image acquiring section 220, facial part acquiring section 230, facial makeup table storing section 240, facial makeup selecting section 250, skin condition acquiring section 260, skin correction makeup table storing section 270, skin correction makeup selecting section 280, makeup presenting section 290 and display section 300.

Capturing section 210, which is, for example, the above-described digital video camera, captures a moving image of the face of the user of makeup assisting apparatus 100. Capturing section 210 outputs the captured moving image to image acquiring section 220. The moving image includes a plurality of time-series images (frame images).

Image acquiring section 220 sequentially acquires the images included in the moving image from the received moving image. Image acquiring section 220 outputs the acquired images to facial part acquiring section 230, skin condition acquiring section 260 and makeup presenting section 290.

Facial part acquiring section 230 acquires an area of a facial part of the face from each of the received images. The area of the facial part is acquired, for example, through matching between each partial area of the image and a template image of each facial part prepared in advance (for example, see PTL 2). Facial part acquiring section 230 outputs information indicating identification information and the area of the acquired facial part (hereinafter, referred to as "facial part information") to facial makeup selecting section 250.

Facial makeup table storing section 240 stores a facial makeup table. The facial makeup table is a table in which a facial part feature value which can be acquired from the image and facial makeup appropriate for the face having the facial part feature value are registered in advance in association with each other. The facial makeup table is, for example, updated at regular intervals from a server on the Internet through a communication circuit (which is not illustrated) provided at makeup assisting apparatus 100.

It is assumed in the present embodiment that principal component analysis is performed in advance on samples of the feature values of the facial part of an unspecified number of faces to which makeup experts have applied facial makeup in the past. It is assumed that the results of the principal component analysis are grouped in advance using a publicly known principal component grouping method in which it is judged based on a determination criterion such as whether or not a principal component value is in or higher. Further, it is assumed that in the facial makeup table, facial makeup which has been applied in the past to the face belonging to the groups is registered for each facial part feature value group.

Further, in the facial makeup table, information regarding cosmetics for the skin required for applying the facial makeup (hereinafter, referred to as "cosmetics information") is further registered for each facial makeup.

Facial makeup selecting section 250 acquires the facial part feature value of the face and selects facial makeup for each facial part by referring to the facial makeup table. It should be noted that facial makeup selecting section 250 may acquire the facial part feature value from the facial part information received from facial part acquiring section 230 or from an image by analyzing the image acquired by image acquiring section 220. Facial makeup selecting section 250 outputs information indicating the selected facial makeup (hereinafter, referred to as "facial makeup information") to makeup presenting section 290.

It should be noted that, as described above, in the facial makeup table, facial makeup is registered for each facial part feature value group. Therefore, facial makeup selecting section 250 determines to which facial part feature value group acquired from the face belongs among the groups registered in the facial makeup table, and selects the facial makeup corresponding to the determined group. This determination is made, for example, by calculating a distance between the acquired facial part feature value and a representative value (centroid) of each group.

Further, facial makeup selecting section 250 acquires cosmetics information of the acquired facial makeup from the facial makeup table. Facial makeup selecting section 250 outputs the acquired cosmetics information to makeup presenting section 290 in association with the facial makeup.

Skin condition acquiring section 260 acquires the skin condition for each of the divided facial areas of the face. The skin condition is acquired by, for example, acquiring a skin area from the image based on the area of the facial part acquired by facial part acquiring section 230 and analyzing an image of the acquired skin area (for example, see PTL 3). Skin condition acquiring section 260 quantifies the acquired skin condition of each divided facial area and compares the obtained value with a value indicating the above-described predetermined level, thereby detecting an area where skin correction is required. Skin condition acquiring section 260 outputs the detected area where skin correction is required, and information indicating the skin condition (hereinafter, referred to as "skin condition information") to skin correction makeup selecting section 280.

Skin correction makeup table storing section 270 stores a skin correction makeup table. The skin correction makeup table is a table in which the skin condition feature value which can be acquired from the image and skin correction makeup appropriate for a skin part having the skin condition feature value are registered in advance in association with each other. The skin correction makeup table is, for example, updated at regular intervals from a server on the Internet through a communication circuit (which is not illustrated) provided at makeup assisting apparatus 100.

It is assumed in the present embodiment that a publicly-known cluster analysis is performed through a nearest neighbor method, a furthest neighbor method, or the like, in advance on samples of the skin condition feature values obtained from an unspecified number of skin parts to which makeup experts have applied skin correction makeup in the past. It is assumed that the samples of the skin condition feature values are grouped according to the results of the cluster analysis and registered. Further, it is assumed that in the skin correction makeup table, skin correction makeup which has been applied in the past to the skin part belonging to the group is registered for each skin condition feature value group.

Further, it is assumed that in the skin correction makeup table, cosmetics information on the cosmetics for the skin required for applying the skin correction makeup is further registered for each skin correction makeup.

Skin correction makeup selecting section 280 acquires the skin condition feature value for the area where skin correction is required among the divided facial areas. Skin correction makeup selecting section 280 selects skin correction makeup for each area where skin correction is required by referring to the skin correction makeup table. It should be noted that skin correction makeup selecting section 280 may acquire the skin condition feature value from the skin condition information received from skin condition acquiring section 260 or from an image by analyzing the image acquired by image acquiring section 220. Skin correction makeup selecting section 280 outputs information indicating the selected skin correction makeup (hereinafter, referred to as "skin correction makeup information") to makeup presenting section 290.

It should be noted that as described above, in the skin correction makeup table, skin correction makeup is registered for each skin condition feature value group. Therefore, skin correction makeup selecting section 280 determines to which skin condition feature value group acquired from the divided facial area belongs among the groups registered in the skin correction makeup table and selects the skin correction makeup corresponding to the determined group. This determination is, for example, performed by calculating a distance between the acquired skin condition feature value and a representative value (centroid) of each group.

Further, skin correction makeup selecting section 280 acquires cosmetics information of the acquired skin correction makeup from the skin correction makeup table. Skin correction makeup selecting section 280 outputs the acquired cosmetics information to makeup presenting section 290 in association with the skin correction makeup.

Makeup presenting section 290 presents, to a user, the selected facial makeup and skin correction makeup in association with the corresponding area of the facial part and the divided facial area. More specifically, makeup presenting section 290 generates a simulation image based on the received image, the facial makeup information and the skin correction makeup information and outputs the generated simulation image to display section 300. Here, the simulation image is an image obtained by superimposing, on the received (captured) image, an image of the face in a case where the selected facial makeup and skin correction makeup are applied.

It should be noted that the image is superimposed by, for example, a publicly-known image combining process such as an alpha ($\alpha$) blending process. In this case, an alpha value ($\alpha$) is set according to concentration of makeup. The alpha blending process is expressed with, for example, the following Equations 1 to 3:

(Equation 1)

$$R = r_1 \times \alpha + r_2 \times (1-\alpha) \quad [1]$$

(Equation 2)

$$G = g_1 \times \alpha + g_2 \times (1-\alpha) \quad [2]$$

(Equation 3)

$$B = b_1 \times \alpha + b_2 \times (1-\alpha) \quad [3]$$

where $r_1$, $g_1$ and $b_1$ are RGB values of an arbitrary area in the captured image, $r_2$, $g_2$ and $b_2$ are RGB values of the corresponding area in an image of makeup, and R, G and B are RGB values of the corresponding area in the simulation image.

Further, it is assumed that an order of application when makeup is applied to the face in an overlapped manner (hereinafter, referred to as an "application order") is set for each makeup, and an image in a case where the makeup is applied is presented as an image shaded with density according to the concentration. The application order defines, for example, blush should be applied after foundation is applied. In this case, the images may be superimposed on the captured image by overpainting the image of each makeup in an order according to the application order.

Further, makeup presenting section 290 generates simulation images sequentially using once selected facial makeup and skin correction makeup for each of the images included in the moving image acquired from image acquiring section 220 and outputs the simulation images to display section 300 (makes display section 300 display the simulation images). That is, makeup presenting section 290 keeps and presents the makeup selected once for one moving image.

Further, makeup presenting section 290 further presents information regarding cosmetics for the skin required for applying the selected facial makeup and skin correction makeup (cosmetics information). More specifically, makeup presenting section 290 superimposes or adds an image or text indicating the received cosmetics information on or to the above-described simulation image.

Display section 300 which is, for example, a display portion of a display with touch panel, displays (presents) the received simulation image and cosmetics information to the user of makeup assisting apparatus 100.

It should be noted that makeup assisting apparatus 100 includes, for example, a CPU, a storage medium such as a ROM having a control program stored therein, and a working memory such as a RAM, which are not illustrated. In this case, functions of the above-described sections are implemented by the CPU executing the control program.

The above-described configuration enables makeup assisting apparatus 100 to present to a user skin correction makeup selected based on the skin condition in association with an area where it is necessary to apply the makeup as well as present facial makeup in association with the corresponding area.

That is, makeup assisting apparatus 100 can present the simulation image of makeup including appropriate skin correction makeup, so that makeup assisting apparatus 100 can appropriately assist makeup even for the face whose skin condition is not favorable.

<Configuration of Table>

Next, some examples of the facial makeup table and the skin correction makeup table will be described.

The facial makeup table, for example, includes a facial makeup ID table, a facial makeup table and a facial cosmetics table.

FIG. 3 illustrates an example of the facial makeup ID table.

As illustrated in FIG. 3, in facial makeup ID table 410, for example, facial makeup ID 412 is described for each facial part feature value group 411. Here, the "facial makeup ID" refers to information for identifying a pattern of one or more types of facial makeup to be applied to one face at one time.

For example, the facial part makeup ID "FM1" is associated with facial part feature value group 411 of "FG1." Therefore, if the facial part feature value acquired from the face belongs to facial part feature value group of "FG1," facial makeup selecting section 250 acquires facial part makeup ID 412 of "FM1."

FIG. 4 illustrates an example of the facial makeup table.

As illustrated in FIG. 4, in facial makeup table 420, for example, for each facial part makeup ID 421, corresponding makeup type 422 is described. Facial part makeup ID 421 corresponds to facial makeup ID 412 in facial makeup ID table 410. Makeup type 422, which is illustrated in a simplified manner in FIG. 4, specifically includes "foundation," "eye shadow," "lipstick," "blush," and the like.

In facial makeup table 420, color 423, concentration 424, range 425 and cosmetics ID 426 are described for each combination of facial part makeup ID 421 and makeup type 422. Color 423, which is illustrated in a simplified manner in FIG. 4, specifically includes an RGB value, a gloss level, and the like. Concentration 424, which is illustrated in a simplified manner in FIG. 4, specifically includes a level of permeability, the way of gradation, and the like when an image is superimposed on the image of the face. Range 425, which is illustrated in a simplified manner in FIG. 4, specifically includes a relative coordinate group from a feature point, a set of a relative position of a central point with respect to a feature point and a radius, and the like. That is, a set of color 423, concentration 424 and range 425 includes at least information required for forming an image.

It should be noted that in facial makeup table 420, an application pattern of the skin cosmetics may be further described. The application pattern of the skin cosmetics is, for example, information indicating a relative range with respect to the facial part, such as eye holes, eye lines, portions below the eyes, or the like in the case of eye shadow.

For example, makeup type 422 of "T1" to "T4" are associated with makeup ID 421 of "FM1." Further, color 423 of "C1," concentration of "D1," the range of "A1" and cosmetics ID 426 of "I1" are associated with a combination of makeup ID 421 of "FM1" and makeup type 422 of "T1." Therefore, if acquired facial makeup ID 421 (412) is "FM1," facial makeup selecting section 250 acquires "C1, D1 and A1" corresponding to makeup type 422 of "T1" as facial makeup information.

Further, if acquired facial makeup ID 412 (421) is "FM1," facial makeup selecting section 250 acquires cosmetics ID 426 of "I1."

Further, facial makeup selecting section 250 acquires the facial makeup information and cosmetics ID 426 corresponding to makeup type 422 of "T2" to "T4" in a similar manner.

FIG. 5 illustrates an example of a facial cosmetics table.

As illustrated in FIG. 5, in facial cosmetics table 430, company ID 432 and item number 433 are described for each cosmetics ID 431. Cosmetics ID 431 corresponds to cosmetics ID 426 in facial makeup table 420. Company ID 432 is a name or an identifier of the company which manufactures or sells the skin cosmetics. Item number 433 is an item number of the skin cosmetics.

For example, company ID 432 of "B1" and item number 433 of "b11" are associated with cosmetics ID 431 of "I1." Therefore, if acquired cosmetics ID 431 (426) is "I1," facial makeup selecting section 250 acquires company ID 432 of "B1" and item number 433 of "b11" as cosmetics information of the facial makeup.

It should be noted that facial makeup ID table 410, facial makeup table 420 and facial cosmetics table 430 illustrated in FIG. 3 to FIG. 5 may be integrated into one table.

The skin correction makeup table includes, for example, the skin correction makeup ID table, the skin correction makeup table and the skin correction cosmetics table.

FIG. 6 illustrates an example of the skin correction makeup ID table.

As illustrated in FIG. 6, in skin correction makeup ID table 460, for example, skin correction makeup ID 462 is described for each skin condition feature value group 461. Here, the "skin correction makeup ID" is information for identifying a pattern of one or more types of skin correction makeup applied to one divided facial area at one time.

For example, skin correction makeup ID 462 of "SM2" is associated with skin condition feature value group 461 of "SG2." Therefore, if the skin condition feature value acquired from the divided facial area belongs to skin condition feature value group 461 of "SG2," skin correction makeup selecting section 280 acquires skin correction makeup ID 462 of "SM2."

FIG. 7 illustrates an example of the skin correction makeup table.

As illustrated in FIG. 7, in skin correction makeup table 470, for example, for each skin correction makeup ID 471, corresponding makeup type 472 is described. Skin correction makeup ID 471 corresponds to skin correction makeup ID 462 in skin correction makeup ID table 460. In skin correction makeup table 470, color 473, concentration 474, range 475 and cosmetics ID 476 are described for each combination of skin correction makeup ID 471 and makeup type 472.

For example, makeup type 472 of "T6" is associated with makeup ID 471 of "SM2." Further, for example, color 473 of "C4," concentration of "D3," the range of "A5" and cosmetics ID 476 of "I5" are associated with a combination of makeup ID 471 of "T6" and makeup type 472 of "T6." Therefore, if acquired skin correction makeup ID 471 (462) is "SM2," skin correction makeup selecting section 250 acquires "C4, D3 and A5" corresponding to makeup type 472 of "T6" as skin correction makeup information.

Further, if acquired skin correction makeup ID 462 (471) is "SM2," skin correction makeup selecting section 250 acquires cosmetics ID 476 of "I5."

FIG. 8 illustrates an example of the skin correction cosmetics table.

As illustrated in FIG. 8, in skin correction cosmetics table 480, company ID 482 and item number 483 are described for each cosmetics ID 481. Cosmetics ID 481 corresponds to cosmetics ID 476 in skin correction makeup table 470.

For example, company ID 482 of "B3" and item number 483 of "b32" are associated with cosmetics ID 481 of "I5." Therefore, if acquired cosmetics ID 481 (476) is "I5," skin correction makeup selecting section 250 acquires company ID 482 of "B3" and item number 483 of "b32" as cosmetics information of skin correction makeup.

It should be noted that skin correction makeup ID table 460, skin correction makeup table 470 and skin correction cosmetics table 480 illustrated in FIG. 6 to FIG. 8 may be integrated into one table.

Further, facial cosmetics table 430 illustrated in FIG. 5 and skin correction cosmetics table 480 illustrated in FIG. 8 may be integrated into one table.

Further, the same cosmetics such as foundation can be used both for facial makeup and for skin correction makeup. Further, the same makeup can be set for both of the 5 facial makeup and skin correction makeup, for example, in a case where a scar at the eye can be concealed with eye shadow.

<Operation of Makeup Assisting Apparatus>

Next, operation of makeup assisting apparatus 100 will be described.

Figure 9:
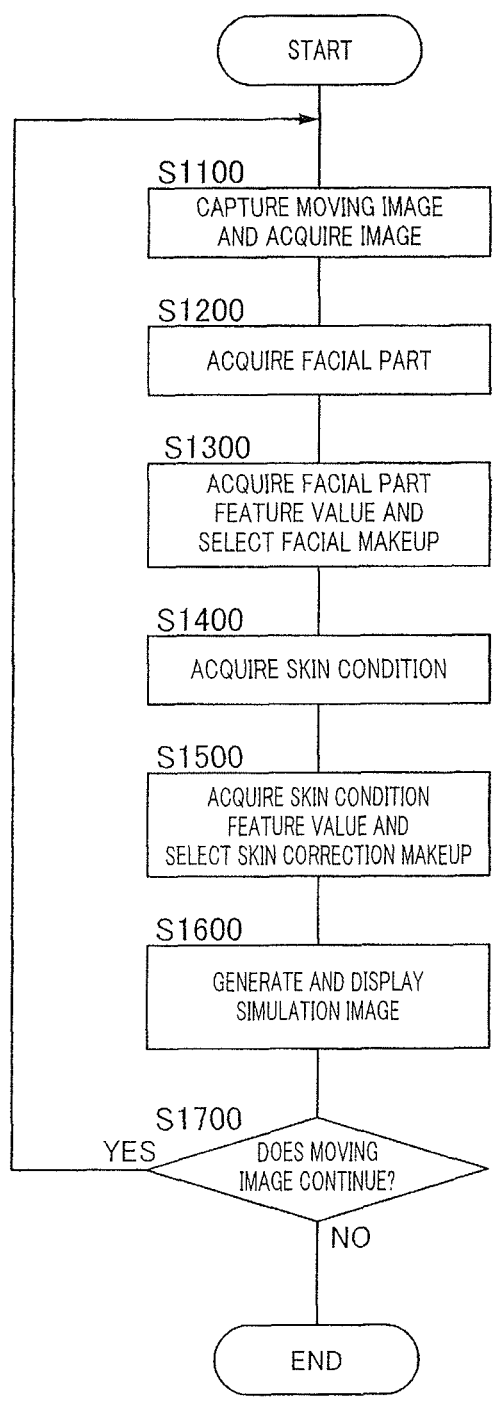
FIG. 9 is a flowchart illustrating exemplary operation of the makeup assisting apparatus according to Embodiment 2.

FIG. 9 is a flowchart illustrating exemplary operation of makeup assisting apparatus 100.

First, in step S1100, capturing section 210 captures a moving image of the face of the user, and image acquiring section 220 acquires images included in the captured moving image.

Figure 10:
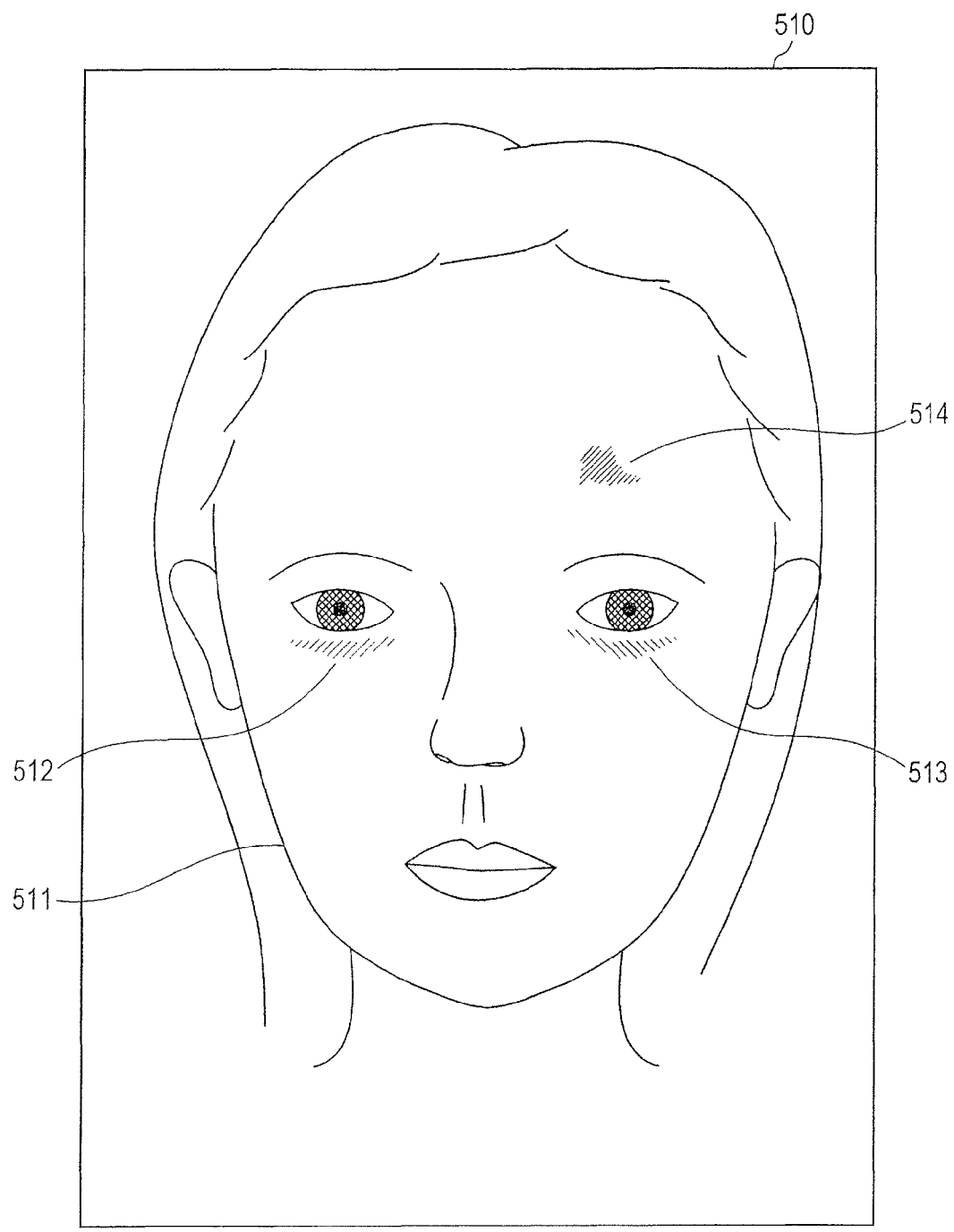
FIG. 10 illustrates an example of an image in Embodiment 2.

FIG. 10 illustrates an example of the image acquired in step S1100 in FIG. 9.

As illustrated in FIG. 10, image 510 includes an image of the face of the user (hereinafter, referred to as a "face image") 511. It is assumed that the user wears no makeup, and as illustrated in FIG. 10, for example, has shadows 512 and 513 below the both eyes and has spot 514 at the forehead.

In step S1200 of FIG. 9, facial part acquiring section 230 acquires a facial part from image 510. At this time, facial part acquiring section 230, for example, extracts feature points (of the facial part) of the face from image 510 by analyzing image 510. Facial part acquiring section 230 acquires an area formed with the feature points constituting the same facial part as an area of the facial part. Facial part acquiring section 230 generates facial part information from the acquired area of the facial part.

Figure 11:
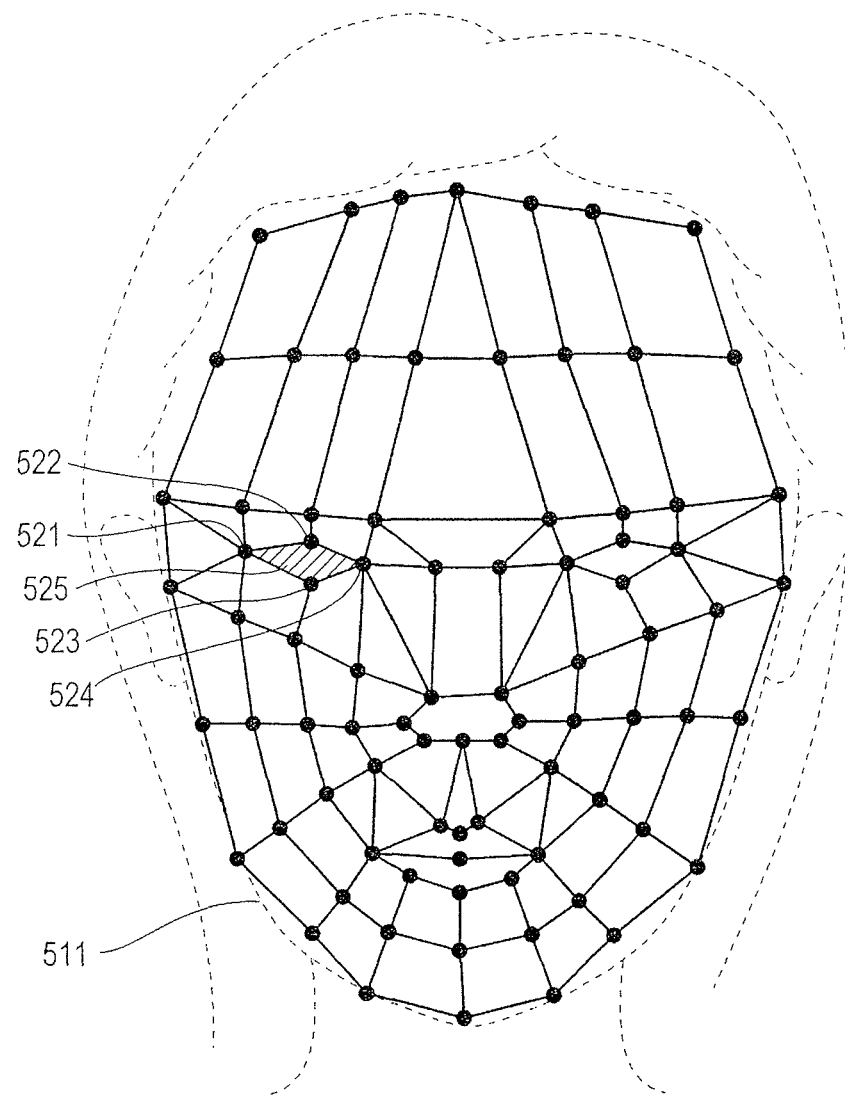
FIG. 11 illustrates an example of placement of feature points of the face in Embodiment 2.

FIG. 11 illustrates an example of placement of feature points of the face, extracted in step S1200 of FIG. 9.

As illustrated in FIG. 11, a plurality of feature points (expressed with a symbol "●") are extracted from face image 511. For example, first to fourth feature points 521 to 524 constitute the right eye. Therefore, facial part acquiring section 230 acquires area 525 enclosed by first to fourth feature points 521 to 524 as an area of the right eye.

FIG. 12 illustrates an example of the facial part information generated in step S1200 of FIG. 9.

As illustrated in FIG. 12, facial part information 530, for example, describes area 532 and person ID 533 for each facial part ID 531. Facial part ID 531 is identification information of the facial part such as the left eye and the upper lip. Area 532, which is information indicating a range of the area of the facial part in the image, is a list of coordinate values of a coordinate system set on the image, for example. Person ID 533 is identification information of the person. As person ID 533, for example, a value designated by the user through operation to a display with touch panel or the like is set every time capturing is started.

In step S1300 of FIG. 9, facial makeup selecting section 250 acquires the facial part feature value and selects facial makeup. The facial part feature value is, as described above, multivariate data regarding a predetermined parameter indicating the features of the face. Facial makeup selecting section 250 acquires the facial part feature value from, for example, image 510 (see FIG. 10), a group of feature points of the face (see FIG. 11), or the facial part information (see FIG. 12). Facial makeup selecting section 250 acquires facial makeup information and cosmetics information corresponding to the acquired facial part feature value from the facial makeup table (see FIG. 3 to FIG. 5).

In step S1400, skin condition acquiring section 260 acquires the skin condition for each of the divided facial areas. At this time, skin condition acquiring section 260 divides the area of the face into a number of divided facial areas, for example, with lines connecting the feature points of the face (see FIG. 11) extracted by facial part acquiring section 230. Skin condition acquiring section 260 analyzes the image for each of the divided facial areas and judges whether or not the area is an area where skin correction is required.

Requirements to be judged as an area where skin correction is required are, for example, that the area has a portion where a value indicating a difference in color of the skin of the facial area from an average value is higher than a predetermined threshold and a ratio of an area of the portion with respect to an area of the face is equal to or higher than a predetermined threshold.

Skin condition acquiring section 260 generates skin condition information for each area where skin correction is required. It should be noted that skin condition acquiring section 260 may process continuous areas where skin correction is required as a single area where skin correction is required.

FIG. 13 illustrates an example of the skin condition information generated in step S1400 of FIG. 9.

As illustrated in FIG. 13, skin condition information 540 describes, for example, area 542, color difference 543, area ratio 544 and person ID 545 for each area ID 541.

Area ID 541 is identification information of an area where skin correction is required. Area 542, which is information indicating a range of the area where skin correction is required in the image, is a list of coordinate values of the coordinate system set on the image, for example. Color difference 543 is, for example, a difference of the color of the skin of the facial area from the average value, of a portion where the color is quite different from the color of the skin of the facial area. Color difference 543, which is illustrated in a simplified manner in FIG. 13, is, specifically, an RGB value, an HSV value, or the like. Area ratio 544, which is illustrated in a simplified manner in FIG. 13, is, specifically, a ratio of an area of a portion where color is quite different from the color of the skin of the facial area with respect to the area of the face, or the like. Person ID 545, which is identification information of the person, corresponds to person ID 533 (see FIG. 12) of facial part information 530.

In step S1500 of FIG. 9, skin correction makeup selecting section 280 acquires the skin condition feature value and selects skin correction makeup. The skin condition feature value is, as described above, multivariate data regarding a predetermined parameter indicating features of the skin condition. Skin correction makeup selecting section 280 acquires the skin condition feature value from, for example, the skin condition information (see FIG. 13). Skin correction makeup selecting section 280 acquires skin correction makeup information and cosmetics information corresponding to the acquired skin condition feature value from the skin correction makeup table (see FIG. 6 to FIG. 8).

In step S1600, makeup presenting section 290 generates a simulation image based on the facial makeup information and the skin correction makeup information, and makes display section 300 display the simulation image. At this time, makeup presenting section 290 makes display section 300 also display the cosmetics information.

Figure 14:
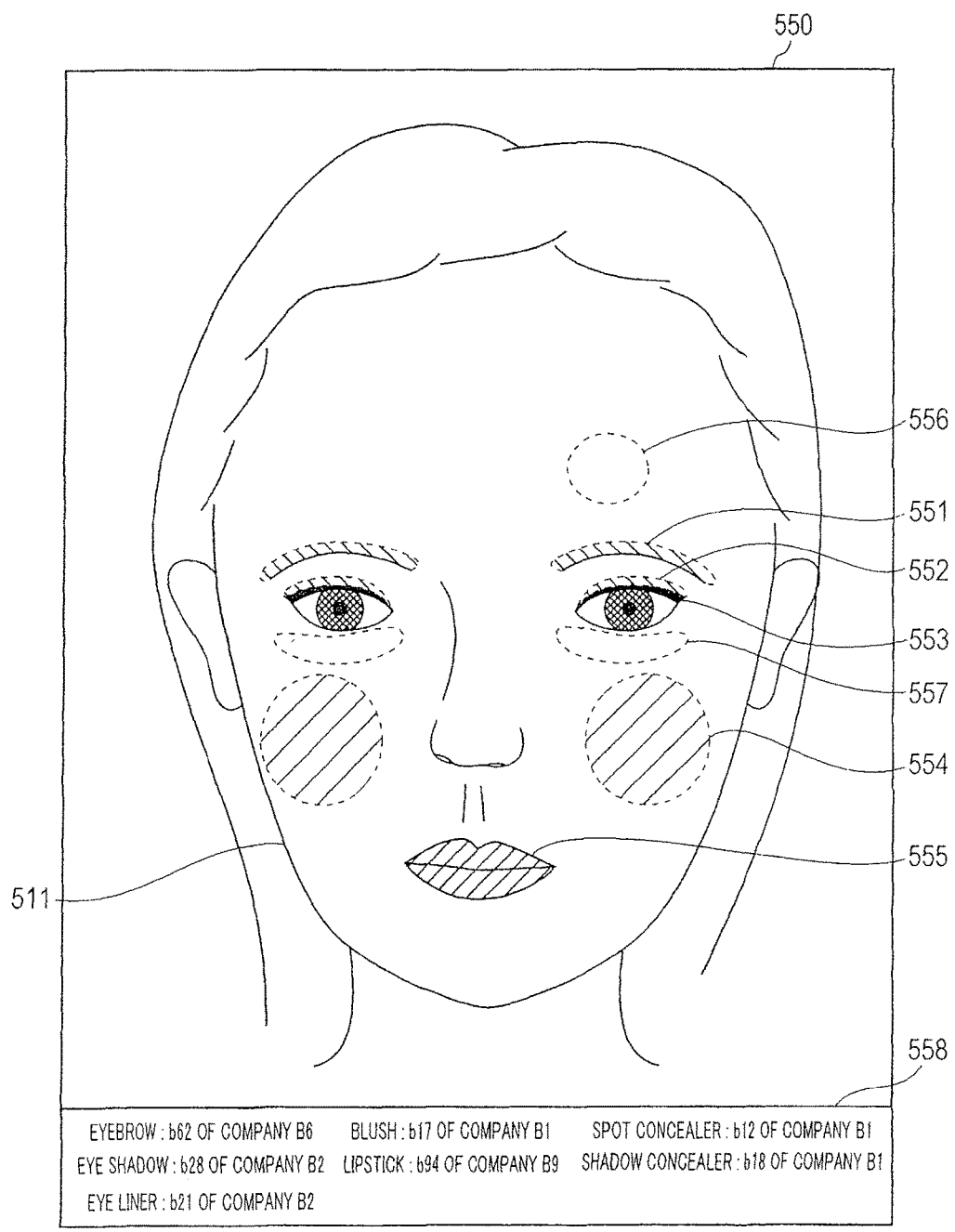
FIG. 14 illustrates an example of a simulation image in Embodiment 2.

FIG. 14 illustrates an example of the simulation image generated in step S1600 of FIG. 9.

As illustrated in FIG. 14, simulation image 550 is an image in which images 551 to 555 of facial makeup such as eyebrow, eye shadow, eye liner, blush and lip stick are superimposed on face image 511.

Further, as illustrated in FIG. 14, simulation image 550 is an image in which images 556 and 557 of skin correction makeup such as concealer for spots and concealer for shadows are superimposed on face image 511. As a result, in simulation image 550, shadows 512 and 513 and spot 514 (see FIG. 10) appearing in original image 511 are concealed.

That is, simulation image 550 indicates a state where both of appropriate skin correction makeup and appropriate facial makeup are virtually applied.

Further, information display area 558, which indicates the cosmetics information, is added to simulation image 550. That is, in simulation image 550, the cosmetics information of the skin cosmetics required for applying the selected facial makeup and skin correction makeup is also displayed. If the user likes makeup shown in the displayed simulation image 550, the user can get required skin cosmetics based on the displayed cosmetics information and can easily put on her makeup actually.

In step S1700, image acquiring section 220 judges whether or not input of a moving image continues. If image acquiring section 220 judges that input of a moving image continues (S1700: Yes), the flow returns to step S1100 and shifts to process on the subsequent image. Meanwhile, if image acquiring section 220 judges that input of a moving image is finished (S1700: No), a series of process is finished.

The operation as described above makes it possible for makeup assisting apparatus 100 to present to the user both facial makeup and skin correction makeup in association with the corresponding area while following the moving image. Therefore, the user can confirm the effect of makeup while changing the orientation and the expression of the face and can experience a sense as if she saw herself actually having put on the makeup in the mirror.

Effect of Present Embodiment

As described above, makeup assisting apparatus 100 according to the present embodiment can present skin correction makeup based on the skin condition in association with an area where it is necessary to apply the makeup as well as present facial makeup in association with the corresponding area. Accordingly, makeup assisting apparatus 100 can appropriately assist makeup even for the face whose skin condition is not favorable.

<Presentation of Skin Care>

While assistance of makeup focused only on makeup itself has been described in the above-described embodiment, it is often the case that the effect of makeup depends on a state of skin care applied to the skin of the face. The skin care, which indicates, here, action taken for the purpose of improving the skin condition, includes, for example, the way of care applied to the skin to improve the skin condition and action for improving the skin condition internally (improving inner beauty). The former includes, for example, application of lotion, massage, and the like. The latter includes, for example, intake of supplements, intake of organic foods, exercise such as yoga, and the like.

Therefore, makeup assisting apparatus 100 may further select skin care for each face based on the skin condition at skin correction makeup selecting section 280, and may further present the selected skin care in association with the face at makeup presenting section 290. However, in this case, it is necessary to analyze the skin condition of the whole face in a comprehensive manner to select appropriate skin care. That is, there is a case where skin condition information for selecting skin care may be different from the above-described skin condition information for selecting skin correction makeup.

Further, makeup assisting apparatus 100 may select and present skin care for each facial part or divided facial area. In this case, it is preferable that makeup assisting apparatus 100 present skin care in association with the corresponding area.

Further, makeup assisting apparatus 100 may be connected to skin care equipment such as, for example, a steamer and facial equipment and present to the user equipment information such as the way of using the above-described skin care equipment at makeup presenting section 290. In this case, makeup presenting section 290 may, for example, communicate with the connected equipment and acquire the equipment information from the equipment or acquire only identification information from the equipment and acquire the corresponding equipment information from the Internet. It should be noted that makeup presenting section 290 may present the way of using the above-described skin care equipment different for each user based on the skin condition of the user.

FIG. 15 illustrates an example of the skin condition information which should be acquired by skin condition acquiring section 260 to select skin care.

As illustrated in FIG. 15, skin condition information 560 for selecting skin care describes, for example, color 562, position 563, shape 564, number 565, area 566, conductivity 567 and reflectivity 568 for each skin item 561.

Skin item 561 indicates a type of skin condition, such as a spot and dullness, for which skin care is required. Color 562 is, for example, an RGB value or an HSV value. This may be an absolute value or, as described above, a difference in color of the skin of the whole face from the average value.

Position 563, which is information indicating a range of an area corresponding to skin item 561 in the image, is a list of coordinate values of the coordinate system set on the image. It should be noted that the coordinate system may be a list of relative coordinate values from the above-described feature points of the face.

The shape which is information indicating the shape of the range of the area corresponding to skin item 561 is, for example, a radius (a major axis diameter and a minor axis diameter), a length, the number of branches, a depth or the like.

Number 565 is, for example, the number of areas each corresponding to skin item 561.

Area 566 is, for example, an area [mm$^2$] of the area corresponding to skin item 561 or an area ratio [%] of the area with respect to a designated range (for example, the facial area).

Conductivity 567 is, for example, impedance [Ω] or the amount of transpiration [mg/sec] from the skin.

Reflectivity 568 is light reflectivity [%], for example.

Skin correction makeup selecting section 280, for example, acquires the skin condition feature value of the whole face from skin condition information 560 for selecting skin care. Further, makeup assisting apparatus 100, for example, stores a table in which the skin condition feature value of the whole face which can be acquired and skin care are registered in advance in association with each other as elements of skin condition information 560 for selecting skin care. Skin correction makeup selecting section 280 acquires skin care corresponding to the acquired feature value with reference to the table and outputs information indicating the skin care to makeup presenting section 290. Makeup presenting section 290, for example, makes display section 300 display the information indicating the skin care and the simulation image together or separately.

As described above, makeup assisting apparatus 100 can assist makeup in a comprehensive manner from skin care by further presenting appropriate skin care to the user.

It should be noted that makeup assisting apparatus 100 may also present information indicating the detected skin condition when presenting skin correction makeup/skin care. In this case, it is preferable that makeup assisting apparatus 100 present the information indicating the skin condition using a value which allows the user to intuitively recognize whether the skin condition is favorable or bad.

For example, makeup assisting apparatus 100 sets 50 for average skin condition of the person, sets 0 for extremely bad skin condition, sets 100 for extremely favorable skin condition, and assign each detectable skin condition a value within the range of 0 to 100. Makeup assisting apparatus 100 presents, to the user, a value corresponding to the skin condition in this allocation along with information that the range of the value indicating the skin condition is from 0 to 100. Accordingly, the user can intuitively recognize whether her skin care is favorable or bad according to how much degree the presented value is away from 50 in either direction.

<Option for Makeup>

While makeup assisting apparatus 100 according to the present embodiment selects one type of makeup from the facial part feature value and the skin condition feature value, the present invention is not limited to this configuration. For example, makeup assisting apparatus 100 may present a plurality of types of makeup as options and set the selected type of makeup as a target to be presented by makeup presenting section 290.

In this case, for example, makeup assisting apparatus 100 selects a plurality of types of facial makeup at facial makeup selecting section 250 and makes display section 300 display identification information of the selected plurality of types of facial makeup. In makeup assisting apparatus 100, facial makeup information for the types of facial makeup selected by the user through operation on a display with touch panel, or the like is output from facial makeup selecting section 250 to makeup presenting section 290.

Particularly, it is assumed that a plurality of types of facial makeup are associated with each facial part feature value group in the facial makeup table, and priority based on such as popularity order in the marketplace is set to the plurality of types of facial makeup. In this case, makeup assisting apparatus 100, for example, presents types of facial makeup with the highest priority to the third highest priority as options at facial makeup selecting section 250. Accordingly, the user can select facial makeup which is consistent with the trend.

Further, in this case, it is preferable that makeup assisting apparatus 100 receives from the user an instruction to switch makeup to be presented at an arbitrary timing. Accordingly, the user can promptly judge makeup which is appropriate and which suits the user's taste from the plurality of types of makeup.

<Other Methods for Selecting Makeup>

Makeup assisting apparatus 100 may select makeup to be presented based on parameters other than the facial part feature value and the skin condition feature value. For example, makeup assisting apparatus 100 may preferentially select makeup which is highly appreciated by people other than the user, such as makeup which is highly appreciated by an unspecified number of users on the Internet.

Further, makeup assisting apparatus 100 may select makeup taking into account an attribute of the person. For example, makeup assisting apparatus 100 preferentially selects makeup applied to the person whose age group and resident area correspond with those of the user among the types of makeup applied in the past by makeup experts. In this case, it is necessary to set information regarding the attribute of the person such as a person ID, occupation and age to the makeup registered in the facial makeup table and the skin correction makeup table and the captured image. Accordingly, it is possible to preferentially present more appropriate makeup if appropriate makeup is different according to the attribute of the person.

<Application of Cosmetics Information>

Further, makeup assisting apparatus 100 may associate link information to a web site where the user can purchase the skin cosmetics with the displayed cosmetics information. In this case, when the user performs operation to determine the makeup, makeup assisting apparatus 100 can display the corresponding web site through the Internet, which can assist the makeup further effectively. Further, it is possible to promote sales of cosmetics for cosmetics companies.

<Other Information to be Presented>

Further, makeup assisting apparatus 100 may generate and display a simulation image of the face for which makeup has been halfway finished instead of the simulation image of the face for which all the makeup has been applied. Further, if an application order is set for each makeup as described above, makeup assisting apparatus 100 may sequentially generate and display simulation images of the face for which makeup has been halfway finished according to the application order. Accordingly, makeup assisting apparatus 100 can present to the user an appropriate order of the makeup.

Further, makeup assisting apparatus 100 may present association with the area of the selected makeup and color and concentration of the selected makeup using text. This text is, for example, "apply blush of item number b55 of company B1 heavily to a range with a diameter of about 4 cm centering around the highest points of the both cheekbones," "apply concealer of item number 78 of company B2 lightly to a range of a width of 1 cm below the both eyes,"

or the like. Some users can imagine the face to which makeup has been applied only from the text information. It is possible to sufficiently assist such users to apply makeup even with such a presenting method.

<Other Presenting Methods>

Further, makeup assisting apparatus 100 may present facial makeup and skin correction makeup using methods other than the method using the simulation image.

For example, makeup assisting apparatus 100 is connected to a printer which transfers a cosmetic agent of the skin cosmetics to a predetermined thin film (a sheet-like medium). This thin film holds the transferred cosmetic agent in such a way as to be easily peeled off. Therefore, the cosmetic agent on the thin film is easily transferred to the skin by being pressed against the skin.

Makeup assisting apparatus 100 sets the same shape and area as those of an area in real space of the captured face to the thin film at makeup presenting section 290 and instructs the printer to transfer facial makeup and skin correction makeup to the corresponding area. It should be noted that the thin film may be either a planar shape or a steric shape.

Accordingly, makeup assisting apparatus 100 can present to the user facial makeup and skin correction makeup on the thin film in association with the corresponding areas.

The user can actually put on the makeup selected based on the simulation image by pressing the entire thin film against the face while aligning positions indicating the corners of the both eyes printed on the thin film to the corners of the both eyes of the user. That is, the user can put on desired makeup easily and quickly without applying a cosmetic agent for each facial part.

<Variations with Other Configurations>

Further, the facial makeup table and the skin correction makeup table are not necessarily stored in makeup assisting apparatus 100. For example, if makeup assisting apparatus 100 can be connected to a network, makeup assisting apparatus 100 can access a server on the network in which the above-described tables are stored and can select facial makeup and skin correction makeup.

Further, makeup assisting apparatus 100 may be a distributed arrangement system, for example, a system in which, among functional sections illustrated in FIG. 2, only capturing section 210 and display section 300 are disposed at a terminal of the user and the other sections of the apparatus are disposed on a server on the network, or the like.

Further, skin condition acquiring section 260 may acquire skin information from sensor information of sensor equipment which detects the skin condition by being brought into contact with the skin, or sensor information (for example, temperature information of a surface of the skin, or the like) of non-contact sensor equipment which acquires the skin information without being brought into contact with the skin, instead of from the image. Further, skin condition acquiring section 260 may acquire the skin condition from information input by the user through operation on the display with touch panel or the like.

Further, skin condition acquiring section 260 may acquire skin condition information from images different from an image to be used as a simulation image, such as an image of the face irradiated with ultraviolet light.

Further, skin condition acquiring section 260 may detect outside light and acquire the facial part feature value and the skin condition feature value in a state where the influence of external light is reduced from the image.

Further, the specific items of makeup are not limited to the above-described examples. For example, facial makeup to be presented includes mascara, lip gloss, and the like. Further, skin correction makeup to be presented includes a highlighter, and the like.

A makeup assisting apparatus according to the present disclosure includes: an image acquiring section that acquires a captured image of a face; a facial part acquiring section that acquires an area of a facial part of the face from the image; a facial makeup selecting section that selects facial makeup for each of the facial parts, the facial makeup being a way of applying the facial makeup; a skin condition acquiring section that acquires a skin condition of the face; a skin correction makeup selecting section that selects skin correction makeup or skin care based on the skin condition, the skin correction makeup being a way of applying the skin correction makeup, and the skin care being a way of applying basic skin care; and a makeup presenting section that presents to a user the selected facial makeup in association with a corresponding area of the facial part and presents the selected skin correction makeup or skin care.

In the makeup assisting apparatus: the skin condition acquiring section may acquire the skin condition for each of divided facial areas obtained by dividing a facial area of the face; the skin correction makeup selecting section may select the skin correction makeup for each of the divided facial areas based on the skin condition acquired for each of the divided facial areas; and the makeup presenting section may present the skin correction makeup in association with a corresponding one of the divided facial areas.

In the makeup assisting apparatus, the makeup presenting section may generate a simulation image obtained by superimposing, on the image, an image indicating a state of the facial makeup and the skin correction makeup when the facial makeup and the skin correction makeup are applied to the face, and present the generated simulation image.

In the makeup assisting apparatus: the skin condition acquiring section may detect an area where skin correction is required, the area being the divided facial area where the skin condition reaches a predetermined level at which the skin correction makeup is to be applied; and the skin correction makeup selecting section may set the area where skin correction is required as a selection target for the skin correction makeup.

The makeup assisting apparatus may further include: a capturing section that captures a moving image of the face of the user; and a display section that displays the simulation image for the user, in which: the image acquiring section may acquire images included in the moving image; and the makeup presenting section may sequentially generate the simulation images for the respective images included in the moving image while keeping the facial makeup and the skin correction makeup selected once for the moving image, and make the display section sequentially display the simulation images.

In the makeup assisting apparatus: the facial makeup selecting section may acquire a facial part feature value of the face and select the facial makeup with reference to a facial makeup table in which of the facial part feature values to be acquired and facial makeup are registered in advance in association with each other; and the skin correction makeup selecting section may acquire a skin feature value for each of the divided facial areas and select the facial makeup with reference to a skin correction makeup table in which the skin feature values to be acquired and skin correction makeup are registered in advance in association with each other.

In the makeup assisting apparatus, the skin condition may include at least one of spot (macule), wrinkle, dullness, shadow, pore, moisture, oil, texture, and ruddiness conditions.

In the makeup assisting apparatus: the facial makeup and the skin correction makeup may include at least a color, application concentration and an application range of a skin cosmetic agent; and the makeup presenting section may further present information regarding cosmetics required for applying the selected facial makeup and skin correction makeup.

Further, makeup assisting apparatus 100 may further include an illuminating section for illuminating the face to be captured. It is preferable that this illuminating section have a dimming function and be capable of reproducing the environmental light (fluorescent light of an office, candle light, illumination at a bar, natural light, or the like) desired by the user in accordance with an instruction from the user. Accordingly, makeup assisting apparatus 100 can simulate makeup while allowing the user to confirm how the makeup actually looks under the desired environmental light.

A makeup assisting method according to the present disclosure includes: acquiring a captured image of a face; acquiring an area of a facial part from the image; selecting facial makeup for each of the facial parts, the facial makeup being a way of applying the facial makeup; acquiring a skin condition of the face; selecting skin correction makeup or skin care based on the skin condition, the skin correction makeup being a way of applying the skin correction makeup, and the skin care being a way of applying basic skin care; and presenting to a user the selected facial makeup in association with a corresponding area of the facial part and presenting the selected skin correction makeup or skin care.

A makeup assisting program according to the present disclosure is a program causing a computer to execute processing including: acquiring a captured image of a face; acquiring an area of a facial part from the image; selecting facial makeup for each of the facial parts, the facial makeup being a way of applying the facial makeup; acquiring a skin condition of the face; selecting skin correction makeup or skin care based on the skin condition, the skin correction makeup being a way of applying the skin correction makeup, and the skin care being a way of applying basic skin care; and presenting to a user the selected facial makeup in association with a corresponding area of the facial part and presenting the selected skin correction makeup or skin care.

The disclosure of the specification, drawings, and abstract in Japanese Patent Application No. 2013-018266 filed on Feb. 1, 2013 is incorporated herein by reference in its entirety.

INDUSTRIAL APPLICABILITY

The present invention is useful as a makeup assisting apparatus, a makeup assisting method and a makeup assisting program which can appropriately assist makeup even for the face whose skin condition is not favorable.

REFERENCE SIGNS LIST

100 Makeup assisting apparatus
210 Capturing section
220 Image acquiring section
230 Facial part acquiring section
240 Facial makeup table storing section
250 Facial makeup selecting section
260 Skin condition acquiring section
270 Skin correction makeup table storing section
280 Skin correction makeup selecting section
290 Makeup presenting section
300 Display section

The invention claimed is:

1. A makeup assisting apparatus comprising a processor, that executes instructions stored in a memory and is configured to:
   acquire a captured image of a face;
   determine areas of facial parts from the captured image, each of the areas of the facial parts being defined by feature points constituting the facial part;
   select facial makeup for each of the facial parts, the facial makeup being a way of applying facial makeup on corresponding one of the facial parts;
   acquire a skin condition for each of divided facial areas into which an area of the face is divided, the divided facial areas being different from the facial parts, the divided facial areas being formed by connecting each of feature points with an adjacent one of the feature points, and determine whether or not skin correction is required for each of the divided facial areas based on the acquired skin condition of each divided facial area;
   select, for at least one of the divided facial areas, for which it is determined that the skin correction is required, skin correction makeup based on a skin condition for the at least one of the divided facial areas, the skin correction makeup being a way of applying skin correction makeup on corresponding one of the divided facial areas, the divided facial areas being different from the facial parts,
   generate a simulation image based on the determined areas of the facial parts, the selected facial makeup for each of the facial parts and the selected skin correction makeup for the at least one of the divided facial areas, the simulation image being obtained by superimposing, on the captured image, an image indicating the selected facial makeup for each of the facial parts and the selected skin correction makeup for the at least one of the divided facial areas when the selected facial makeup and the selected skin correction makeup are applied to the face; and
   display the simulation image.

2. The makeup assisting apparatus according to claim 1, wherein the processor is further configured to:
   present the skin correction makeup in association with a corresponding one of the divided facial areas.

3. The makeup assisting apparatus according to claim 1, wherein
   the processor determines whether the skin correction is required, when a skin condition for corresponding one of the divided facial areas reaches a predetermined level; and
   wherein the processor is further configured to set the at least one of the divided facial areas where skin correction is required as a selection target for the skin correction makeup.

4. The makeup assisting apparatus according to claim 3, wherein the processor is further configured to:
   capture a moving image of the face of a user;
   acquire images included in the moving image;
   sequentially generate simulation images for the respective images included in the moving image while keeping the facial makeup and the skin correction makeup selected once for the moving image, and sequentially display the simulation images.

5. The makeup assisting apparatus according to claim 1, wherein the processor is further configured to:
acquire a partial feature value of the face;
select the facial makeup with reference to a facial makeup table in which the partial feature values to be acquired and the facial makeup are registered in advance in association with each other;
acquire a skin feature value for each of the divided facial areas; and
select the skin correction makeup with reference to a skin correction makeup table in which the skin feature values to be acquired and skin correction makeup are registered in advance in association with each other.

6. The makeup assisting apparatus according to claim 1, wherein the skin condition includes at least one of spot (macule), wrinkle, dullness, shadow, pore, moisture, oil, texture, and ruddiness conditions.

7. The makeup assisting apparatus according to claim 1, wherein:
the facial makeup and the skin correction makeup include at least a color, application concentration and application range of a skin cosmetic agent; and
the processor is further configured to present information regarding cosmetics required for applying the selected facial makeup and the skin correction makeup.

8. The makeup assisting apparatus according to claim 1, wherein the facial makeup is selected independent of the skin condition.

9. A makeup assisting method comprising:
acquiring a captured image of a face;
determining areas of facial parts from the captured image, each of the areas of the facial parts being defined by feature points constituting the facial part;
selecting facial makeup for each of the facial parts, the facial makeup being a way of applying facial makeup on corresponding one of the facial parts;
acquiring a skin condition for each of divided facial areas into which an area of the face is divided, the divided facial areas being different from the facial parts, the divided facial areas being formed by connecting each of feature points with an adjacent one of the feature points, and determine whether or not skin correction is required for each of the divided facial areas based on the acquired skin condition of each divided facial area;
selecting, for at least one of the divided facial areas, for which is it determined that the skin correction is required, skin correction makeup based on a skin condition for the at least one of the divided facial areas, the skin correction makeup being a way of applying skin correction makeup on corresponding one of the divided facial areas, the divided facial areas being different from the facial parts; and
generating a simulation image based on the determined areas of the facial parts, the selected facial makeup for each of the facial parts and the selected skin correction makeup for the at least one of the divided facial areas, the simulation image being obtained by superimposing, on the captured image, an image indicating the selected facial makeup for each of the facial parts and the selected skin correction makeup for the at least one of the divided facial areas when the selected facial makeup and the selected skin correction makeup are applied to the face; and
displaying the generated simulation image.

10. A non-transitory computer-readable storage medium with an executable computer program that causes a computer processor to execute processing, comprising:
acquiring a captured image of a face;
determining areas of facial parts from the captured image, each of the areas of the facial parts being defined by feature points constituting the facial part;
selecting facial makeup for each of the facial parts, the facial makeup being a way of applying facial makeup on corresponding one of the facial parts;
acquiring a skin condition for each of divided facial areas into which an area of the face is divided, the divided facial areas being different from the facial parts, the divided facial areas being formed by connecting each of feature points with an adjacent one of the feature points, and determine whether or not skin correction is required for each of the divided facial areas based on the acquired skin condition of each divided facial area;
selecting, for at least one of the divided facial areas, for which it is determined that the skin correction is required, skin correction makeup based on a skin condition for the at least one of the divided facial areas, the skin correction makeup being a way of applying skin correction makeup on corresponding one of the divided facial areas, the divided facial areas being different from the facial parts;
generating a simulation image based on the determined areas of the facial parts, the selected facial makeup for each of the facial parts and the selected skin correction makeup for the at least one of the divided facial areas, the simulation image being obtained by superimposing, on the captured image, an image indicating the selected facial makeup for each of the facial parts and the selected skin correction makeup for the at least one of the divided facial areas when the selected facial makeup and the skin selected correction makeup are applied to the face; and
displaying the generated simulation image.

* * * * *